(12) United States Patent
Jung et al.

(10) Patent No.: US 9,324,360 B2
(45) Date of Patent: Apr. 26, 2016

(54) STORAGE MEDIUM HAVING INTERACTIVE GRAPHIC STREAM AND APPARATUS FOR REPRODUCING THE SAME

(75) Inventors: Kil-soo Jung, Hwaseong-si (KR); Man-seok Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 2501 days.

(21) Appl. No.: 12/047,703

(22) Filed: Mar. 13, 2008

(65) Prior Publication Data

US 2008/0151994 A1 Jun. 26, 2008

Related U.S. Application Data

(63) Continuation of application No. 11/033,761, filed on Jan. 13, 2005.

(30) Foreign Application Priority Data

Jan. 13, 2004 (KR) .................................. 2004-2412
May 18, 2004 (KR) ................................ 2004-35078

(51) Int. Cl.
| | |
|---|---|
| G11B 19/02 | (2006.01) |
| G11B 27/10 | (2006.01) |
| G11B 27/34 | (2006.01) |
| H04N 5/445 | (2011.01) |
| H04N 9/82 | (2006.01) |

(Continued)

(52) U.S. Cl.
CPC ............ *G11B 19/025* (2013.01); *G11B 27/105* (2013.01); *G11B 27/34* (2013.01); *H04N 5/44504* (2013.01); *H04N 5/44543* (2013.01); *H04N 9/8205* (2013.01); *G11B 2220/2541* (2013.01); *H04N 9/8042* (2013.01); *H04N 21/4104* (2013.01); *H04N 21/488* (2013.01)

(58) Field of Classification Search
None
See application file for complete search history.

(56) References Cited

U.S. PATENT DOCUMENTS

| 5,539,479 A | 7/1996 | Bertram |
| 5,687,160 A | 11/1997 | Aotake et al. |

(Continued)

FOREIGN PATENT DOCUMENTS

| CN | 1212569 | 3/1999 |
| CN | 1428043 | 7/2003 |

(Continued)

OTHER PUBLICATIONS

First Office Action issued May 9, 2008 by the State Intellectual Property Office of the People's Republic of China re: Chinese Application No. 2007101125659 (12 pp).

(Continued)

*Primary Examiner* — William C Vaughn, Jr.
*Assistant Examiner* — Michael J Hess
(74) *Attorney, Agent, or Firm* — NSIP Law

(57) ABSTRACT

A storage medium including an interactive graphic stream providing menus using various transition effects regardless of reproducing modes of multimedia data and an apparatus for reproducing the same. The storage medium in which multimedia information is recorded includes: video data; and graphic data to provide a menu screen overlaid on an image based on the video data, wherein the graphic data provides a plurality of menu pages. Accordingly, a plurality of menu pages may be provided regardless of application types of a main stream, and various transition effects may be applied when transitions between menu pages are performed.

4 Claims, 13 Drawing Sheets

(51) Int. Cl.
  *H04N 9/804* (2006.01)
  *H04N 21/41* (2011.01)
  *H04N 21/488* (2011.01)

(56) References Cited

U.S. PATENT DOCUMENTS

| | | | |
|---|---|---|---|
| 5,907,658 | A | 5/1999 | Murase et al. |
| 6,067,400 | A | 5/2000 | Saeki et al. |
| 6,141,004 | A | 10/2000 | Jeong |
| 6,246,401 | B1 | 6/2001 | Setogawa et al. |
| 6,246,402 | B1 | 6/2001 | Setogawa et al. |
| 6,469,718 | B1 | 10/2002 | Setogawa et al. |
| 6,701,064 | B1 | 3/2004 | De Haan et al. |
| RE39,745 | E | 7/2007 | Setogawa et al. |
| 7,634,739 | B2 | 12/2009 | McCrossan et al. |
| 7,653,882 | B2 | 1/2010 | Hörentrup et al. |
| 2003/0068161 | A1* | 4/2003 | Lasorsa et al. ............ 386/111 |
| 2003/0152370 | A1* | 8/2003 | Otomo et al. ............ 386/98 |
| 2003/0185981 | A1 | 10/2003 | Min et al. |
| 2003/0229900 | A1 | 12/2003 | Reisman |
| 2004/0047588 | A1 | 3/2004 | Okada et al. |
| 2004/0096199 | A1 | 5/2004 | Chou et al. |
| 2004/0131336 | A1 | 7/2004 | Matsuno et al. |
| 2004/0136698 | A1* | 7/2004 | Mock ............ 386/123 |
| 2004/0250275 | A1 | 12/2004 | Green |
| 2005/0002650 | A1 | 1/2005 | Seo et al. |
| 2005/0021903 | A1 | 1/2005 | Baxter, Jr. |
| 2005/0110805 | A1 | 5/2005 | Sekine et al. |
| 2005/0149214 | A1 | 7/2005 | Yoo et al. |
| 2005/0152682 | A1 | 7/2005 | Kang et al. |
| 2006/0056804 | A1 | 3/2006 | Seo et al. |
| 2006/0188223 | A1 | 8/2006 | Ikeda et al. |
| 2006/0291810 | A1 | 12/2006 | McCrossan et al. |

FOREIGN PATENT DOCUMENTS

| | | |
|---|---|---|
| CN | 1879170 A | 11/2003 |
| CN | 1816866 | 8/2006 |
| EP | 0898279 A2 | 2/1999 |
| EP | 1043724 A1 | 10/2000 |
| EP | 1115118 A2 | 7/2001 |
| EP | 0886276 A2 | 11/2003 |
| EP | 1381232 A1 | 1/2004 |
| JP | 10-028273 | 1/1998 |
| JP | 11-112931 | 4/1999 |
| KR | 1999-37477 | 5/1999 |
| KR | 2000-2692 | 1/2000 |
| KR | 10-2003-0079181 | 10/2003 |
| KR | 10-2004-0083517 | 10/2004 |
| KR | 2005-4339 | 1/2005 |
| KR | 2005-5074 | 1/2005 |
| RU | 2181929 | 4/2002 |
| WO | WO 98/43415 | 10/1998 |
| WO | WO 01/99415 A2 | 12/2001 |
| WO | WO 2005/048261 A1 | 5/2005 |
| WO | WO 2005/048592 A1 | 5/2005 |
| WO | WO 2005/069304 A1 | 7/2005 |

OTHER PUBLICATIONS

Japanese Office Action issued on Jun. 15, 2010, in corresponding Japanese Patent Application No. 2006-549130 (4 pages).
Office Action issued by Taiwanese Patent Office in Taiwanese Patent Application No. 094100960 on Jun. 2004, 2008.
Supplementary European Search Report issued on Aug. 8, 2011, in counterpart European Patent Application No. 05710819.3 (3 pages, in English).
Mexican Office Action issued Sep. 14, 2011, in counterpart Mexican Patent Application No. MX/a/2008/015607 (3 pages).
Mexican Office Action issued Sep. 15, 2011, in counterpart Mexican Patent Application No. MX/a/2008/015608 (3 pages).
Mexican Office Action issued Sep. 15, 2011, in counterpart Mexican Patent Application No. MX/a/2008/015609 (3 pages).
Office Action issued on Dec. 8, 2006 by the Korean Intellectual Property Office for Korean Patent Application No. 2004-35078.
Examination Report issued in Indian Patent Application No. 818/MUMNP/2006 on Apr. 12, 2007.
U.S. Appl. No. 11/033,761, filed Jan. 13, 2005, Kil-soo Jung et al., Samsung Electronics Co., Ltd.
U.S. Appl. No. 12/047,671, filed Mar. 13, 2008, Kil-soo Jung et al., Samsung Electronics Co., Ltd.
U.S. Appl. No. 12/047,685, filed Mar. 13, 2008, Kil-soo Jung et al., Samsung Electronics Co., Ltd.
U.S. Appl. No. 12/047,716, filed Mar. 13, 2008, Kil-soo Jung et al., Samsung Electronics Co., Ltd.
Russian Office Action issued Feb. 22, 2012 in counterpart Russian Application No. RU 2008110824 with English language translation (8 pages).
Russian Decision on Grant issued Feb. 22, 212 in counterpart Russian Application No. RU 2008110825 with English language translation (9 pages).
Russian Office Action issued Feb. 22, 2012 in counterpart Russian Application No. RU 2008110823 with English language translation (8 pages).
U.S. Appl. No. 60/519,317, filed Nov. 12, 2003 (12 pages in English).
European Examination Report mailed Sep. 13, 2012, issued in counterpart European Patent Application No. 05 710 819.3; 5 pages in English.
Russian Decision on Grant Patent for Invention, mailed Oct. 24, 2012, issued in counterpart Russian Patent Application No. 2008110823; 11 pages including English translation.
Chinese Office Action mailed Jun. 1, 2012 issued in counterpart Chinese Patent Application No. 200580002255.0 (9 pages, including English language translation).

* cited by examiner

FIG. 6

```
interactive composition segment( ) {
    segment_type
    segment_length
    composition_number
    composition_state
    command_update_flag
    composition_time_out_pts
    UO_mask_table( )
    animation_frame_rate_code
    default_selected_page_id
    while(processed length < segment length) {
        page( ) {
            page_id
            selection_time_out_duration
            default_selected_button_number
            default_activated_button_number
            while(processed length < segment length) {
                button( ) {
                    button_number
                    numerically_selectable_flag
                    auto_action_flag
                    button_horizontal_position
                    button_vertical_position
                    neighbor_info( ) {
                        upper_button_number
                        lower_button_number
                        left_button_number
                        right_button_number
                    }
                    normal_state_info( ) {
                        page_change_start_object_id_normal
                        page_change_end_object_id_normal
                        start_object_id_normal
                        end_object_id_normal
                        repeat_object_id_normal
                    }
                    selected_state_info( ) {
                        page_change_start_object_id_normal
                        page_change_end_object_id_normal
                        start_object_id_selected
                        end_object_id_selected
                        repeat_selected_flag
                    }
                    actioned_state_info( ) {
                        start_object_id_activated
                        end_object_id_activated
                    }
                    num_of_button_commands
                    for(cmd_id=0;cmd_id<num_of_button_commands;cmd_id++) {
                        button_command[cmd_id]
                    } /*for*/
                } /*button*/
            } /*while*/
        } /*page*/
    } /*while*/
} /*interactive composition segment*/
```

610 → page( )
612 → button( )
614 → page_change_start_object_id_normal / page_change_end_object_id_normal
616 → start_object_id_normal / end_object_id_normal

| composition_state | EFFECT | REMARK |
|---|---|---|
| NORMAL CASE (NC) | DISPLAY UPDATE | CURRENT DISPLAY SET INCLUDES ONLY ELEMENTS CHANGED FROM PREVIOUS COMPOSITION INFORMATION |
| ACQUISITION POINT (AP) | DISPLAY REFRESH | CURRENT DISPLAY SET INCLUDES ALL ELEMENTS FOR DISPLAYING SUBSEQUENT COMPOSITION |
| EPOCH START (ES) | NEW DISPLAY | NEW EPOCH STARTS, AND CURRENT DISPLAYING SUBSEQUENT COMPOSITION |

FIG. 7B

| composition_update_flag | DEFINITION |
|---|---|
| 0b | ALL BUTTON COMMANDS IN CURRENT ICS ARE EQUAL TO BUTTON COMMANDS IN PREVIOUS ICS |
| 1b | BUTTON COMMANDS IN CURRENT ICS ARE CHANGED FROM BUTTON COMMANDS IN PREVIOUS ICS |

FIG. 7C

| numerically_selectable_flag | DEFINITION |
|---|---|
| 0b | BUTTON CANNOT BE DIRECTLY SELECTED USING button_number OF BUTTON |
| 1b | BUTTON CAN BE DIRECTLY SELECTED USING button_number OF BUTTON |

FIG. 7D

| auto_action_flag | DEFINITION |
|---|---|
| 0b | BUTTON IS CHANGED TO selected_state MODE WHEN BUTTON IS SELECTED |
| 1b | BUTTON IS CHANGED TO actioned_state MODE WITHOUT DISPLAYING SELECTED BUTTON IMAGE WHEN BUTTON IS SELECTED |

FIG. 8

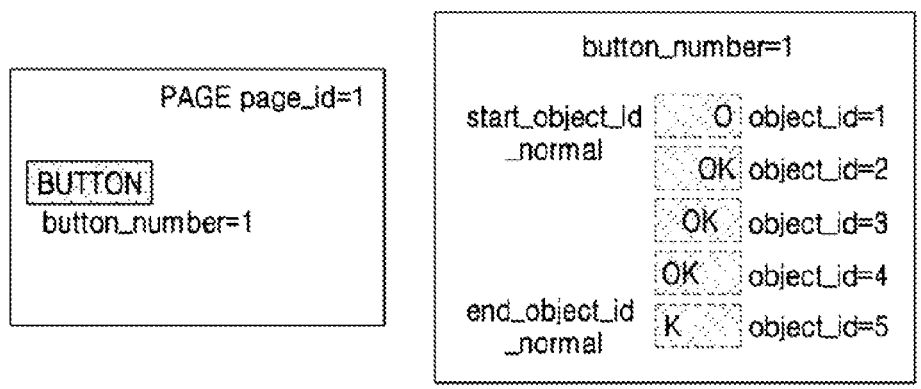

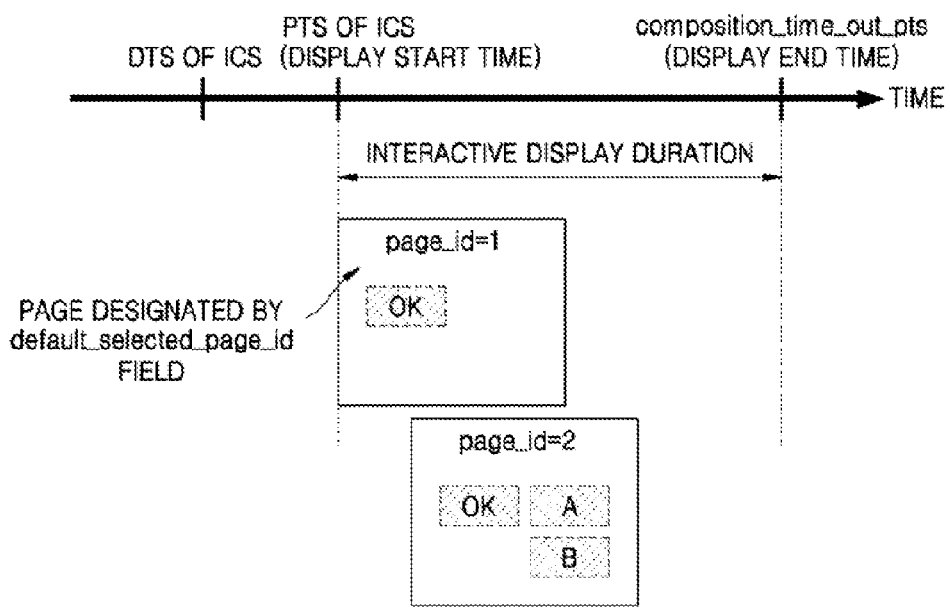

FIG. 12

```
interactive composition segment( ) {

......

while(prodessed length < segment length) {
      page( ) {
         page_id
         page_disappear_duration        ——1202
         selection_time_out_duration
         default_selected_button_number
         default_actioned_button_number
         while(processed length < segment length) {
            button( ) {
               ......
```

|    | Name                          | Meaning                                  |
|----|-------------------------------|------------------------------------------|
| 0  | Interactive Graphics          | Interactive Graphics Stream Number       |
| 1  | Audio                         | Audio Stream Number                      |
| 2  | Presentation Graphics         | Presentation Graphics Stream Number      |
| 3  | Angle                         | Angle Number                             |
| 4  | Title                         | Title Number                             |
| 5  | Chapter                       | Chapter Number                           |
| 6  | PlayList                      | PlayList Number                          |
| 7  | PlayItem                      | PlayItem Number                          |
| 8  | Presentation Time             | Presentation Time in 90kHz               |
| 9  | Timer                         | Navigation Timer                         |
| 10 | Selected Button               | Button Number in Selected State          |
| 11 | Selected Page                 | Page ID                                  ← 1302
| 12 | -                             | -                                        |
| 13 | Parental                      | Parental Level                           |
| 14 | Video Configuration           | Player Configuration for Video           |
| 15 | Audio Conifiguration          | Player Configuration for Audio           |
| 16 | Audio Language                | Language Code for Audio                  |
| 17 | Subtitle Language             | Language Cde for Presentation Graphics   |
| 18 | Menu Language                 | Language Code for Menu Description       |
| 19 | Interactive Graphics Language | Language Cde for Interactive Graphics    |
| ...| ...                           | ...                                      |

1402 : DISC INSERTING
1408 : GOING TO VALID STATUS
1414 : PAGE TRANSITING
1418 : GOING TO INVALID STATUS

FIG. 16

```
                                                                    1410
Get default_selected_page_id from Interactive Composition Segment —1602
Get the Page ID in Selected State from PSR11  —1604 if(default_selected_page_id is valid Page ID)
{
    Set default_selected_page_id to PSR11  —1606
}
else if (the value of PSR11 is valid Page ID)
{
    /* PSR11 is already set a valid page_id, this procedure do not change.*/—1608
}
else
{
    Set page_id of first entry in Interactive Composition Segment to PSR11 —1610
}
```

FIG. 17

```
                                                                    1416
/* change to page ID=X*/ if(X is valid Page ID)
{
    Set X to PSR11 —1702
}
else
{
    /* if page ID X is invalid, this procedure keeps current selected page ID*/—1704
}
```

US 9,324,360 B2

STORAGE MEDIUM HAVING INTERACTIVE GRAPHIC STREAM AND APPARATUS FOR REPRODUCING THE SAME

CROSS-REFERENCE TO RELATED APPLICATIONS

This application is a continuation application of U.S. Ser. No. 11/033,761 filed Jan. 13, 2005, now pending, which claims the benefit of Korean Application No. 10-2004-0002412, filed Jan. 13, 2004, in the Korean Intellectual Property Office, and 10-2004-0035078, filed on May 18, 2004 in the Korean Intellectual Property Office, the disclosures of which are incorporated herein in their entirety by reference.

BACKGROUND OF THE INVENTION

1. Field of the Invention

The present invention relates to reproduction of multimedia data, and, more particularly, to a storage medium including an interactive graphic stream providing menus using various transition effects regardless of reproducing modes of multimedia data. The present invention also relates to an apparatus to reproduce multimedia data.

2. Description of the Related Art

In order to reproduce multimedia data, AV data, navigation data to control reproduction of the AV data, and system data are recorded in the storage medium. The system data includes introduction information of a title of AV data to be first reproduced when a storage medium is inserted in a reproducing apparatus. Besides this data, additional data may be included in the storage medium. In particular, various kinds of information required to reproduce video, audio, subtitles, and menus are multiplexed into one main stream and recorded in the AV data.

FIG. 1 is a configuration of AV data in which various elemental streams are multiplexed. Referring to FIG. 1, a video stream 102, an audio stream 104, a presentation graphic stream 106 to provide subtitles, and an interactive graphic stream 108 to provide a menu screen of an interaction with a user are multiplexed into one main stream and recorded in a storage medium in which multimedia data is recorded. Hereinafter, the multiplexed main stream is called AV data 110.

In particular, the interactive graphic stream 108 to provide a menu screen to allow an interaction with a user includes a plurality of segments. FIG. 2 is a configuration of the interactive graphic stream 108 out of the elemental streams shown in FIG. 1.

Referring to FIG. 2, the interactive graphic stream 108 includes a plurality of segments. A unit displayed on one screen from an interactive composition segment (ICS) to an end segment is called a display set. One display set includes, but is not limited to including:

1) An ICS to record composition information of an interactive graphic;

2) A palette definition segment (PDS) to define palette information of color and/or clearness which is to be applied to the interactive graphic;

3) A plurality of object definition segments (ODSs) to define object data, including image information such as buttons, to be displayed on a screen;

4) An end segment indicating the end of the display set.

In particular, the ICS includes output termination time information of a relative display set, button composition information, and operation information of a reproducing apparatus according to a user operation. The ICS may be realized using an ICS data structure.

Each segment included in one display set is recorded in a packetized elementary stream (PES), which is a packet unit of an MPEG-2 transport stream (TS). The relative display set starts to be decoded at a decoding time stamp (DTS) included in the PES and starts to be outputted to a display screen at a presentation time stamp (PTS).

Also, an output termination time of the relative display set is determined by a value of a composition_time_out_pts field recorded in the ICS. The composition_time_out_pts field will be described later. Accordingly, the interactive graphic stream 108 is output to the screen at a designated time (PTS), receives a user operation, performs corresponding operations, and disappears from the screen at the determined output termination time (composition_time_out_pts).

Due to the data structure as is described above, the ICS has the following disadvantages. First, where a plurality of page menus are provided, since movement to preceding and subsequent menu pages is possible only through a user operation according to a general menu characteristic, a PTS defined in a PES packet including an ICS has a meaning only in a first menu page, and PTSs in subsequent pages do not have any meaning. Therefore, in order to construct a plurality of page menus, an application type of a main stream should be set to a browsable slide show. That is, in a case where a main stream is a movie application, a plurality of page menus cannot be realized. Second, a transition effect between menu pages in a plurality of page menus cannot be provided.

SUMMARY OF THE INVENTION

The present invention provides a storage medium having recorded thereon an interactive graphic stream providing a plurality of page menus even in a case where a main stream is a movie application and an apparatus to reproduce the same.

The present invention also provides a storage medium having recorded thereon an interactive graphic stream by which various transition effects may be applied when transitions between pages are performed and an apparatus for reproducing the same.

According to an aspect of the present invention, there is provided a storage medium in which multimedia information is recorded, comprising: video data; and graphic data to provide a menu screen overlaid on an image based on the video data, wherein the graphic data provides a plurality of menu pages.

The graphic data may include composition information and object information of menus.

The graphic data may further include color information of the menu screen.

The composition information of the menus may include information of the plurality of menu pages.

The information of the plurality of menu pages may be identified by a unique identification (ID) for each page.

The information of the plurality of menu pages may further include information of transition effects applied when transitions between the plurality of menu pages are performed.

The information of the transition effects may be designated for each button included in the plurality of menu pages, for each menu page included in the plurality of menu pages, or for each group for some buttons included in the plurality of menu pages.

The information of the plurality of menu pages may further include duration information to designate a predetermined menu page to automatically disappear from a display screen when a user operation does not take place during a predetermined duration after the predetermined menu page is displayed.

The information of transition effects may include at least one of a menu page transition effect, a button transition effect, and a button animation effect.

The composition information of the menus may be a composition segment of a display set of an MPEG-2 transport stream.

According to another aspect of the present invention, there is provided a multimedia reproducing apparatus comprising: a decoder decoding video data; and a graphic decoder decoding graphic data to provide a menu screen overlaid on an image based on the video data, wherein the graphic decoder provides a plurality of menu pages.

The apparatus may further include a memory storing a unique ID of a currently reproduced menu page.

The graphic decoder may provide a page transition effect by setting the memory as a unique ID of a menu page to be changed.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is an example of the interactive composition segment to provide a plurality of menu pages according to an embodiment of the present invention;

FIGS. 7A through 7D are definitions of data to illustrate fields of the interactive composition segment according to an embodiment of the present invention;

FIG. 8 illustrates an example in which an animation effect is applied to button objects in the same menu page according to an embodiment of the present invention;

FIG. 10 illustrates an example of the interactive composition segment to apply a screen transition effect in page units according to another embodiment of the present invention;

FIG. 11 illustrates the screen transition effect in page units shown in FIG. 10 on a time axis;

FIG. 12 is an example of an interactive composition segment including an operation of designating a time point at which a menu page disappears from a screen when a user operation does not take place over a predetermined duration according to another embodiment of the present invention;

FIG. 13 is an example of a status register included in a reproducing apparatus according to an embodiment of the present invention;

FIG. 16 illustrates a processing procedure due to a reproducing state change shown in FIG. 14; and FIG. 17 illustrates a processing procedure due to generation of a page transition request shown in FIG. 14.

DETAILED DESCRIPTION OF THE EMBODIMENTS

Figure 1:
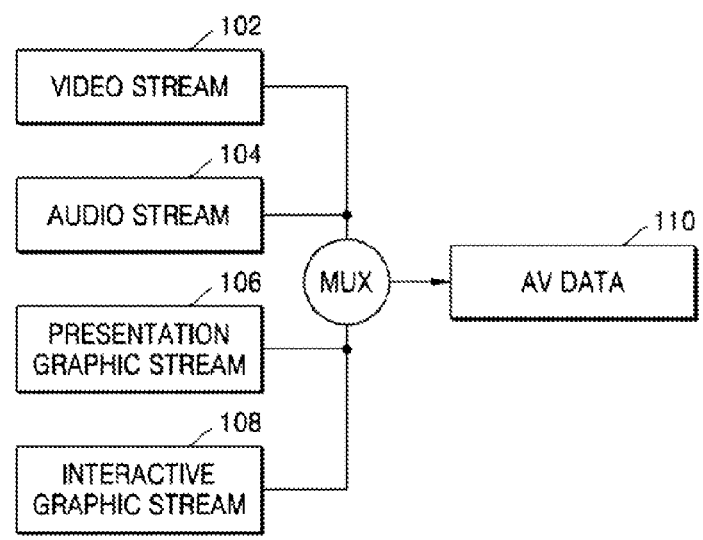
FIG. 1 is a configuration of AV data in which various elemental streams are multiplexed.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
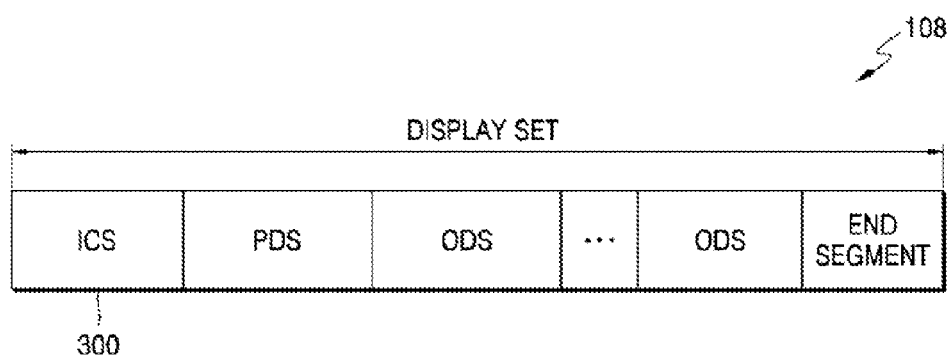
FIG. 2 is a configuration of an interactive graphic stream of the elemental streams shown in FIG. 1.
Figure 3:
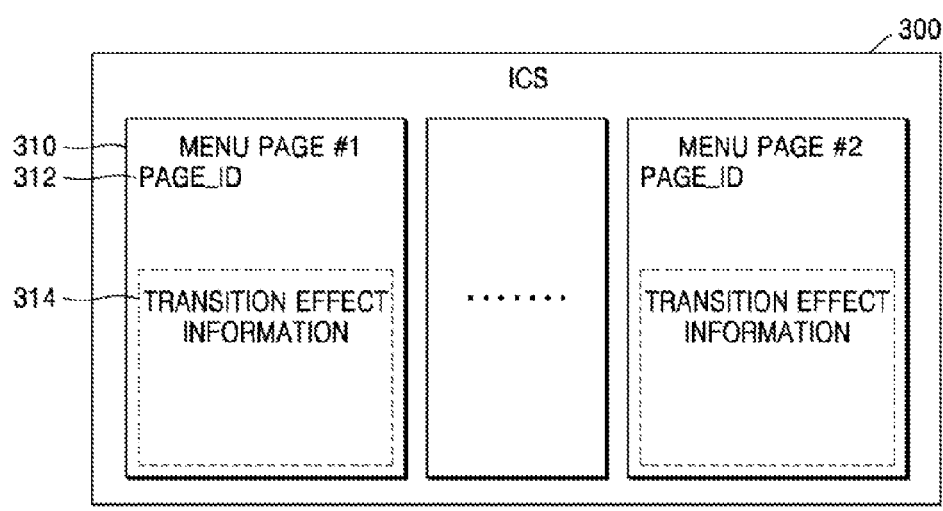
FIG. 3 is a configuration of an interactive composition segment to provide a plurality of menu pages according to an embodiment of the present invention.

FIG. 3 is an example of the interactive composition segment (ICS) shown in FIG. 2. More specifically, FIG. 3 shows a configuration of an ICS 300 to provide a plurality of menu pages according to an embodiment of the present invention.

Referring to FIG. 3, the ICS 300 includes a plurality of menu pages 310. Each menu page 310 includes a group of a plurality of buttons constructing one menu screen and is identified by a page identification (ID) page_id 312. That is, a plurality of menu pages 310 are included in one ICS 300, and transition effect information 314, applied when another page is transited to a relative page, is included in one menu page 310.

Figure 4:
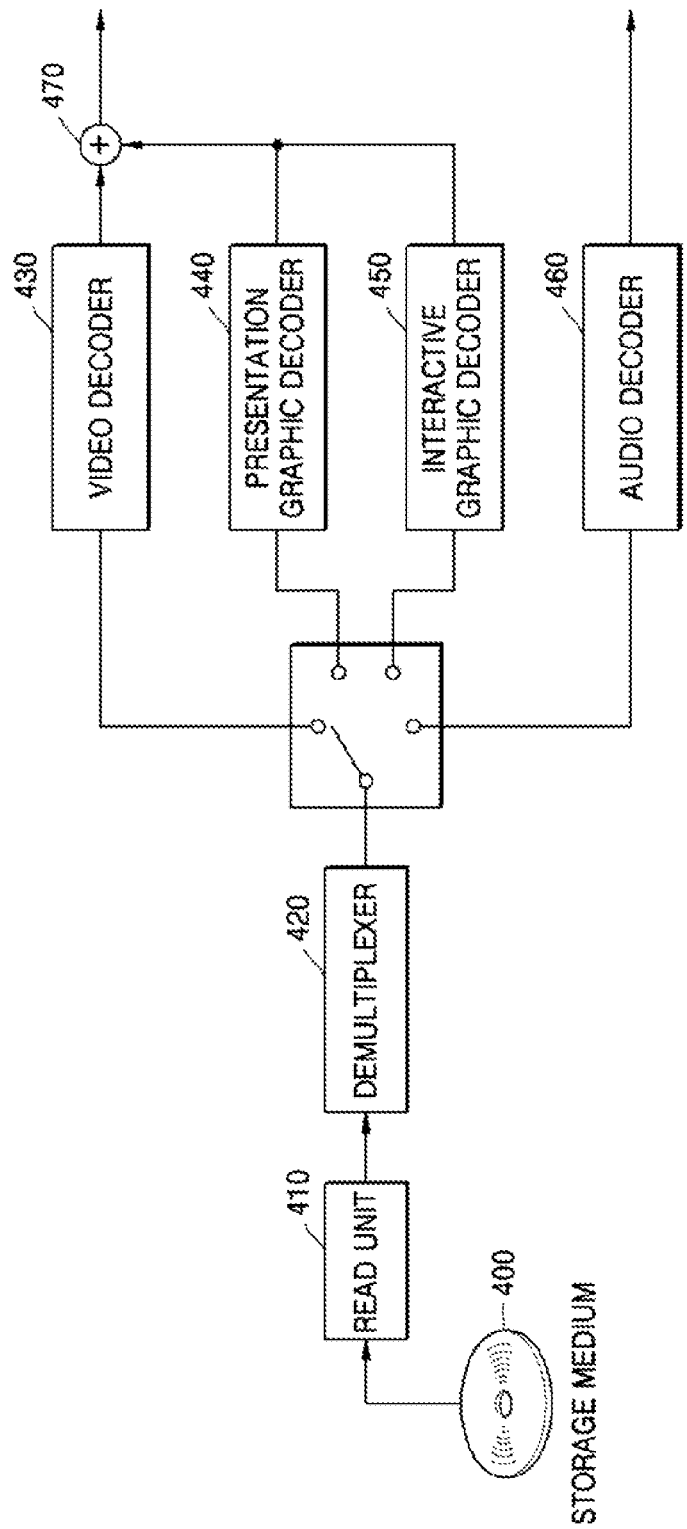
FIG. 4 is a block diagram of an apparatus to reproduce AV data according to an embodiment of the present invention.

FIG. 4 is a block diagram of an apparatus to reproduce AV data 110 according to an embodiment of the present invention. Referring to FIG. 4, the reproducing apparatus includes a read unit 410, a demultiplexer 420, a plurality of decoders 430 through 460, and a blender 470.

In detail, the read unit 410 reads the multiplexed AV data 110 from a storage medium 400 and transmits the read AV data 110 to the demultiplexer 420. The demultiplexer 420 divides the transmitted AV data 110 into a video stream 102, an audio stream 104, a presentation graphic stream 106, and an interactive graphic stream 108 according to data types and transmits the divided streams 102 through 108 to the corresponding decoders 430 through 460, respectively. Each stream transmitted to the corresponding decoder is decoded according to a data type thereof and waits to be output to a screen at a designated time. The decoded video stream 102, presentation graphic stream 106, and/or interactive graphic stream 108 are overlaid into one image by the blender 470. A selected image is output to the screen based on an output state set by a user. For example, the output state of the reproducing apparatus may be controlled on the basis of user selection such as on/off of subtitles and mute audio.

In particular, the interactive graphic decoder 450 receives the interactive graphic stream 108 from the storage medium 400, decodes the received interactive graphic stream 108, and outputs a menu screen including buttons on the screen at a designated time. The user selection may be input by the user selecting a specific button in the output menu screen. That is, a user interactive operation may be provided.

Figure 5:
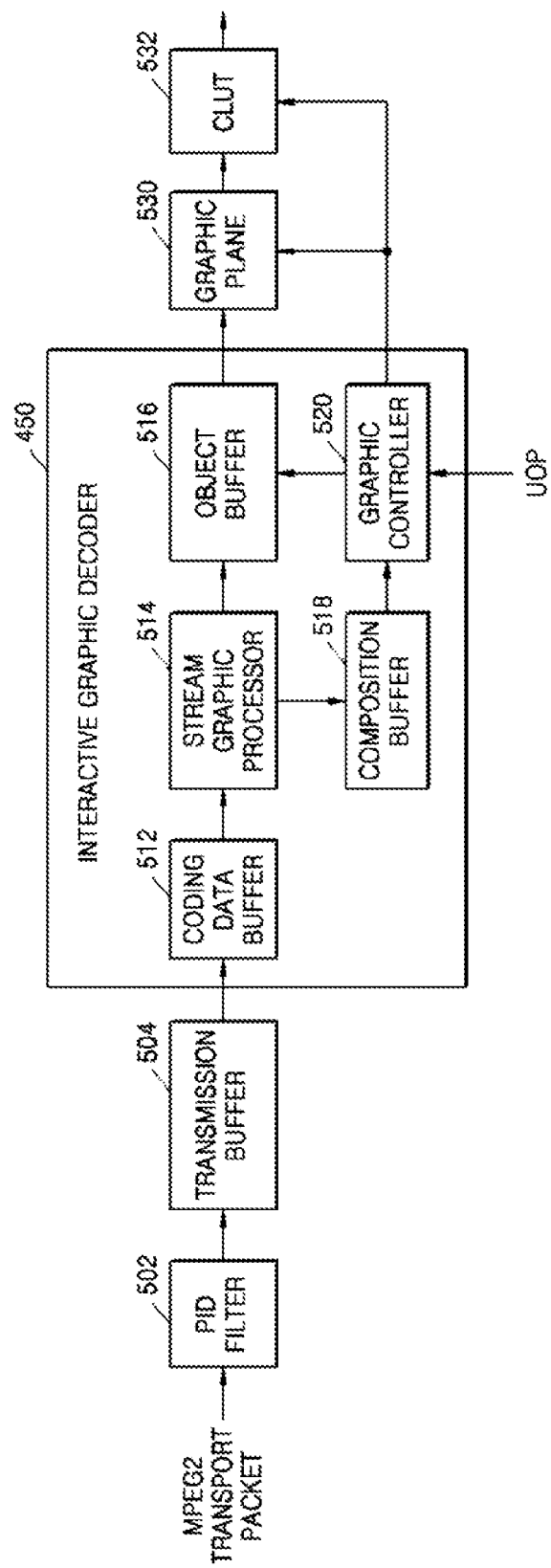
FIG. 5 is a block diagram of an interactive graphic decoder, which processes an interactive graphic stream and is a part of the reproducing apparatus shown in FIG. 4, according to an embodiment of the present invention.

FIG. 5 is a block diagram of the interactive graphic decoder 450, which processes the interactive graphic stream 108 and is a part of the reproducing apparatus shown in FIG. 4, according to an embodiment of the present invention.

Referring to FIG. 5, in the AV data 110 read from the storage medium 400, only the interactive graphic stream 108 is selectively transmitted to a transmission buffer 504 through a packet identifier (PID) filter 502 and decoded by the interactive graphic decoder 450.

The interactive graphic stream 108 is temporarily stored in a coding data buffer 512 in the interactive graphic decoder 450 and is later transmitted to a stream graphic processor 514. After the transmitted interactive graphic stream 108 is decoded by the stream graphic processor 514, object data to define button images is transmitted to an object buffer 516, and composition information of buttons is transmitted to a composition buffer 518. A graphic controller 520 constructs an output image by referring to composition information, which is stored in the composition buffer 518, corresponding to each transmitted object data and transmits the constructed image to a graphic plane 530. That is, at a PTS, which is an output beginning time of the interactive graphic stream 108, an image to be output onto a current screen is determined under a control of the graphic controller 520, and the determined image is transmitted from the object buffer 516 to the graphic plane 530. The transmitted image is output by referring to a color lookup table (CLUP) 532 according to color information included in its associated composition information. Also, the graphic controller 520 changes a button state according to movement or selection of a button by receiving a user operation (UOP). The graphic controller then reflects the changing result on the screen output.

In particular, the ICS 300 shown in FIG. 3 is decoded and stored in the composition buffer 518. The graphic controller 520 controls an output of a graphic image stored in the object buffer 516 by referring to decoded ICS information stored in the composition buffer 518.

FIG. 6 is an example of an ICS to provide a plurality of menu pages according to an embodiment of the present invention.

Referring to FIG. 6, an example of a syntax structure of an ICS according to an embodiment of the present invention is illustrated. The ICS includes a plurality of menu pages 610, and each menu page includes a plurality of buttons 612.

FIGS. 7A through 7D are definitions of data for illustrating fields of the ICS according to an embodiment of the present invention. Referring to FIGS. 6 and 7A through 7D, a semantic structure of each field of the ICS will now be described in detail.

1) segment_type: This is a field to indicate an ICS.

2) segment_length: This is a field to indicate the number of bytes of the ICS.

3) composition_number: This is a field to indicate a unique value of the ICS in an interactive graphic stream. When the ICS is changed or updated, the value sequentially increases from 0.

4) composition_state: This is a field to indicate types of a display set included in the ICS.

In detail, FIG. 7A illustrates the types of the display set included in the ICS. Referring to FIG. 7A, the interactive graphic stream is comprised of units, each unit being called an epoch, in consideration of an operating model of the interactive graphic decoder 450 described above. All of interactive graphic objects included in one epoch are decoded by the interactive graphic decoder 450 and continuously stored in the object buffer 516 included in the interactive graphic decoder 450, and unless next epoch data is input, the contents are equally maintained. Accordingly, in one epoch, the interactive graphic objects, which have been decoded and stored in the object buffer 516, may be reused without decoding the interactive graphic objects every time. However, when one epoch ends and a subsequent epoch starts, all of buffers in the interactive graphic decoder 450 are reset, and all stored data disappears. Also, when the buffers in the interactive graphic decoder 450 are reset may be defined as a predetermined time in one epoch.

A display set is defined as an output unit of the interactive graphic objects as described in FIG. 3. The display set indicates a set of interactive graphic objects output onto one screen, and one epoch may include at least one display set. There exist three types of the display set. First, the display set in an epoch start (ES) state indicates the start of an epoch and includes all data to output interactive graphics, such as interactive graphic composition information required to construct the interactive graphics and object data to be used to construct button images. Second, the display set in an acquisition point (AP) state may exist after the ES display set, and the AP display set includes all information to construct the interactive graphics of a case in which a user randomly searches. Third, the display set in a normal case (NC) includes only data to be changed out of the interactive graphics constructed by a previous display set, i.e., only data to be updated. A plurality of display sets may be included in one epoch as shown in FIG. 7A. The epoch begins with the ES display set, and the AP or NC display set may follow the ES display set. The ES display set is necessarily included in one epoch, and the AP or NC display set is selectively included.

Referring to FIG. 6, each field of the ICS will now be described in succession.

5) composition_update_flag: This is a field indicating a correlation of button commands between a previous ICS and a current ICS.

In detail, FIG. 7B illustrates definitions of a composition_update_flag value. Referring to FIG. 7B, when the composition_update_flag value is "0b," button commands of a previous ICS and a current ICS are all the same, and when the composition_update_flag value is "1b," the button commands are changed.

6) composition_time_out_pts: This is a field indicating an interactive display terminating time. At the terminating time, the ICS is neither valid any more nor displayed on the screen. A PTS refers to a PTS of main video.

7) UO_mark_table: This is a field indicating whether to allow user operations for all interactive display durations defined in the ICS.

8) animation_frame_rate_code: This is a field to designate a frame rate applied to button transition effects and/or moving buttons.

9) default_selected_page_id: This is a field indicating a page ID of a page basically displayed when reproduction of the ICS begins.

A basic definition portion of the ICS has been described, and page structures indicating a plurality of pages are included in the ICS. A configuration of the page structures indicating a plurality of pages will now be described.

10) page_id: This is a field indicating a unique ID of each page in the plurality of page structures 610 in the ICS. In an embodiment of the invention, the reproducing apparatus stores an ID of a page currently displayed on the screen among the plurality of pages in the ICS in a system register. A configuration of the system register will be described with reference to FIG. 13 later.

11) selection_time_out_duration: This is a field to designate a valid duration during which a button may be selected after an associated page thereof is displayed on the screen. If the user does not select a button before the time designated by the selection_time_out_duration field expires, a button designated by a default_activated_button_number field to be described later is activated. Here, the button designated by the default_activated_button_number field is activated only when the button designated by the default_activated_button_number field is valid.

12) default_selected_button_number: This is a field to designate a number of a button basically selected when associated menu page thereof is displayed on the screen.

13) default_activated_button_number: This is a field to designate a number of a button to be automatically activated in a case where the user does not select a button from when an associated menu page thereof is displayed on the screen to when the time designated by the selection_time_out_duration field expires. If a value of the default_activated_button_number field is assigned to "0xFF," after the time designated by the selection_time_out_duration field expires, a currently selected button is activated, and if the value of the default_activated_button_number field is assigned to "0x00," no buttons are activated.

A definition portion of the page structures indicating a plurality of pages has been described, and button structures indicating a plurality of buttons included in each menu page are included in each page structure. A configuration of the button structures indicating a plurality of pages will now be described.

14) button_number: This is a field indicating a unique ID of each button in the plurality of button structures in the menu page. Also, this field may be used when a relative button is selected using a number. Values from 1 to 99 may be used.

15) numerically_selectable_flag: This is a field indicating whether a relative button may be directly selected using a button_number field of the button.

In detail, FIG. 7C illustrates whether the button may be directly selected using the button_number field of the button. Referring to FIG. 7C, if a value of the numerically_selectable_flag field is "0b," the button cannot be directly selected using the button_number field of the button, and if the value of the numerically_selectable flag field is "1b," the button may be directly selected using the button_number field of the button.

16) auto_action_flag: This is a field to designate an operating mode of a relative button.

In detail, FIG. 7D illustrates operating modes of the button. Referring to FIG. 7D, if a value of the auto_action_flag field is "0b," when the button is selected, an operating mode of the button is changed to a selected_state mode, and if the value of the auto_action_flag field is "1b," the operating mode of the button is changed to an actioned_state mode without displaying a button image. The operating modes are defined in a lower portion of FIG. 6.

17) button_horizontal_position: This is a field to designate a horizontal position of a top-left pixel of a relative button.

18) button_vertical_position: This is a field to designate a vertical position of the top-left pixel of a relative button.

19) upper (lower/left/right)_button_number: This is a field to designate a button_number field of a button selected by a UOP using a move_up (down/left/right)_selected_button field when the button is selected by moving an arrow in a up/down/left/right direction.

20) page_change_start_object_id_normal (selected): This is a field to designate an ID object_id of a first button object to display a button of normal (selected)_state having a transition effect when a menu page is displayed on the screen at the first time or transited to another menu page.

21) page_change_end_object_id_normal (selected): This is a field to designate an ID object_id of a last button object to display a button of normal (selected)_state having a transition effect when a menu page is displayed on the screen at the first time or transited to another menu page.

22) start_object_id_normal (selected): This is a field to designate an ID object_id of a first button object, which should be displayed on the screen after displaying of a button object designated by the page_change_end_object_id_normal (selected) field is finished.

23) end_object_id_normal (selected): This is a field to designate an ID object_id of a last button object to display the button of the normal (selected)_state on the screen.

24) repeat_normal (selected)_flag: This is a field to designate whether to continuously repeat an animation of the normal (selected)_state. If a value of the start_object_id_normal (selected) field is equal to a value of the end_object_id_normal (selected) field, the repeat_normal (selected)_flag field has a value of "0x00."

25) start_object_id_activated: This is a field to designate an ID object_id of a first button object to display the button of the actioned_state on the screen.

26) end_object_id_activated: This is a field to designate an ID object_id of a last button object to display the button of the actioned_state on the screen.

27) number_of_button_command: This is a field to indicate the number of commands related to a relative button. If a value of the number_of_button_command field is set to 0, the button is used as only a simple graphic image without a command.

28) button_command[cmd_id]: This is a field to store one navigation command corresponding to one button. If a button is selected by the user, a corresponding navigation command is activated.

As is described above, according to the example of the ICS 300 according to an embodiment of the present invention, when a specific menu page is displayed on the screen, 1) fields 614 to give a screen transition effect of each button included in the menu page and 2) fields 616 to give an animation effect of each button after the screen transition effect are designated.

Therefore, a manufacturer should produce a plurality of button objects to display desired screen transition effects and a plurality of button objects for animation effects of buttons, which should be continuously displayed on a page after the screen transition effects. As a result of these methods, the manufacturer may provide screen transition effects of various methods.

Basically, in order to provide more dynamic screen transition in button units, whether the number of button objects included between the page_change_start_object_id_normal (selected) field and the page_change_end_object_id_normal (selected) field for each button is not the same does not matter. However, in a case where the same transition effect such as a fade-in/out effect is applied to an entire page, in order to provide a smooth screen transition effect, all buttons included in the page, in an embodiment of the invention, have the same number of button objects included between the page_change_ start_object_id_normal (selected) field and the page_change_end_object_id_normal (selected) field. In a case where the screen transition effect is unnecessary, values of the two fields are, in an embodiment of the invention, equal to the value of the start_object_id_normal (selected) field.

An example in which the fields 614 to give a screen transition effect for each button included in the menu page and the fields 616 to give an animation effect for each button after the screen transition effect are used will be described in detail. That is, an example in which the manufacturer produces a plurality of screen transition button objects and applies a screen transition effect between different pages will be described. Where two pages having the same value of the composition_number field are included in an ICS, a first menu page in which page_id=1 is shown in FIG. 8, and a second page in which page_id=2 is shown in FIG. 9.

FIG. 8 illustrates an example in which an animation effect is applied to button objects in the same menu page according to an embodiment of the present invention.

Referring to FIG. 8, one button having button_number=1 is displayed in the first menu page. For the animation effect, the button includes five different button objects in which object_id=1 through 5. Each button object is changed and displayed according to a frame rate designated in the animation_frame_rate_code field of each button object. Accordingly, the button animation effect may be realized.

Figure 9:
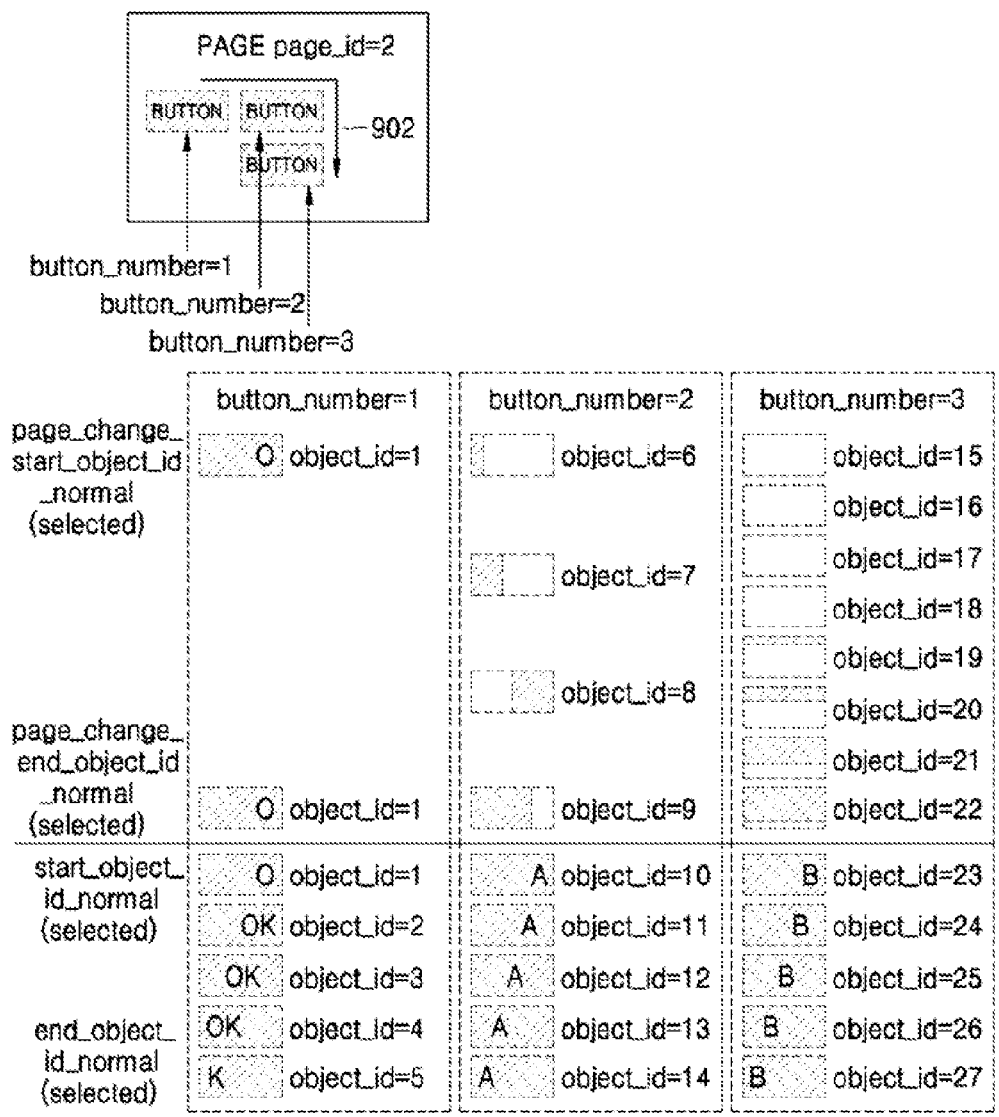
FIG. 9 illustrates an example of a screen transition effect between different menus using a plurality of screen transition objects according to another embodiment of the present invention.

FIG. 9 illustrates an example of a screen transition effect between different menus using a plurality of screen transition objects according to another embodiment of the present invention.

Referring to FIG. 9, the second menu page in which page_id=2 is shown. For example, the user may change the first menu page in which page_id=1 to the second menu page in which page_id=2 by activating a button in which button_number=1 of the first menu page. Here, an effect of showing buttons in which button_number=1, 2, and 3 included in the second menu page in which page_id=2 one by one from the left to the right and from the top to the down as indicated by an arrow 902 will be described. In order to provide the screen transition effect, a plurality of button objects are displayed according to values of the page_change_start_object_id_normal (selected) field and the page_change_end_object_id_normal (selected) field. In detail, in the present embodiment, in a case of the button in which button_number=1, since there is no difference in the sense of sight from the button included in the first menu page in which page_id=1, a button object for the screen transition effect is not additionally included.

Therefore, the values of the page_change_start_object_id_normal (selected) field and the page_change_end_object_id_normal (selected) field designate the same object_id=1 as a value of the start_object_id_normal (selected) field. Accordingly, if the first menu page is transited to the second menu page, the basic animation effect is repeatedly displayed as described in FIG. 8. Here, commands included in the button may be changed according to a manufacturer's purpose.

In a case of buttons in which button_number=2 and 3, in order to provide the screen transition effect, the buttons include a plurality of button objects in which object_id=6 through 9 and object_id=15 through 22, respectively. Accordingly, the screen transition effect as indicated by the arrow 902 is displayed. For each of the buttons in which button_number=2 and 3, after displaying a button object corresponding to the page_change_end_object_id_normal (selected) field of each button, a plurality of button objects for an animation effect existing between a button object indicated by the start_object_id_normal (selected) field and a button object indicated by the end_object_id_normal (selected) field are repeatedly displayed on the screen. Accordingly, the animation effect may be represented along with the screen transition effect.

FIG. 10 illustrates an example of the ICS to apply a screen transition effect in page units according to another embodiment of the present invention.

Referring to FIG. 10, unlike the methods of performing screen transitions in button units as shown in FIGS. 8 and 9, a method of applying a screen transition effect for each button group defined in a specific page or applying a screen transition effect in page units is illustrated.

In order to perform screen transitions in page units, the page_change_start_object_id_normal (selected) field and the page_change_end_object_id_normal (selected) field used to give the screen transition effect in button units in the example of the syntax structure of the ICS 300 shown in FIG. 6 may be removed, and a field to apply the screen transition effect to an entire menu page may be added.

Referring to FIG. 10, an example of adding a transition_effect field 802 in a page structure in order to apply the screen transition effect in page units is illustrated. That is, a predetermined screen transition effect may be represented by, after predetermined screen transition effects that may be supported by all reproducing apparatuses are pre-defined, allocating attribute values to the pre-defined screen transition effects and designating an attribute value of a screen transition effect desired by the manufacturer to the transition_effect field 802.

FIG. 11 illustrates the screen transition effect in page units shown in FIG, 10 on a time axis.

Referring to FIG. 11, the shown time axis of an interactive graphic stream is equal to a time axis of a video stream. In a PES packet data including an ICS as described in FIGS. 8 and 9, interactive graphic stream data, such as an ICS, a PDS, and an ODS is decoded to fit a decoding time stamp (DTS), which is decoding time information included in the PES packet data during reproduction of video. After the decoding is finished, a page designated by a default_selected_page_id field is displayed on the screen at a PTS, which is presentation time information. In response to a navigation command of a specific button included in the displayed menu page, a screen transition between pages is performed. Also, since a valid interactive display duration is finished at the time designated by a composition_time_out_pts field, the menu page is not displayed on the screen any more.

As is described above, in a plurality of menu pages included in one ICS, transitions between menu pages may be smoothly performed in response to navigation commands allocated to specific buttons of the menu pages in a valid interactive display duration by defining a beginning time (PTS) and an ending time (composition_time_out_pts) of an entire interactive display duration.

FIG. 12 is an example of an ICS including an operation of designating a time point at which a menu page disappears from a screen when a user operation does not take place during a predetermined duration according to another embodiment of the present invention.

Referring to FIG. 12, the ICS of this embodiment may be used as a pop-up menu during reproduction of a movie. In this case, if a menu displayed on the screen is continuously displayed until a display ending time designated by a composition_time_out_pts field as described in FIG. 11, a user may feel inconvenient when the user watches multimedia video such as high quality movie. Therefore, as shown in FIG. 12, a field to designate a currently displayed menu page to disappear when a predetermined time elapses may be added.

In the present embodiment, a page_disappear_duration field 1202 is defined. That is, the field to designate how long to wait before a current menu page disappears when a UOP does not take place after the current menu page is displayed on the screen is added. In other words, if a manufacturer designates a certain time value to the field, a current menu page is not displayed when the time designated to the field elapses in a state where a UOP does not take place after the current menu page is displayed. Here, data included in the displayed menu page does not disappear, however, the data is just not displayed on the screen.

As is described above, in a case where a plurality of menu pages are included in an ICS, in order to transit to another menu page, one of the buttons included in a previous menu page should have a navigation command to transit to another menu page. That is, the navigation command will be a command to replace a page_id value of a currently displayed menu page with a page_id value of a new menu page to be transited. A reproducing apparatus, according to an embodiment of the present invention, displays the new menu page on the screen on the basis of the replaced page_id value. Therefore, the reproducing apparatus of this embodiment includes menu page information in a system register to store reproduction information of a currently reproducing storage medium. A page transition effect may be realized by the navigation command setting a value of the system register storing menu page information therein.

A page transition process will now be described in detail.

FIG. 13 is an example of a status register included in a reproducing apparatus according to an embodiment of the present invention.

Referring to FIG. 13, an example of a system register (player status register: PSR) of the reproducing apparatus to support a plurality of menu pages in the same ICS is illustrated. A PSR11 1302 stores page_id information of a currently reproducing menu page in a specific ICS of an interactive graphic stream. A page transition may be performed by one of buttons included in the ICS re-establishing the PSR11 1302 using a navigation command.

Figure 14:
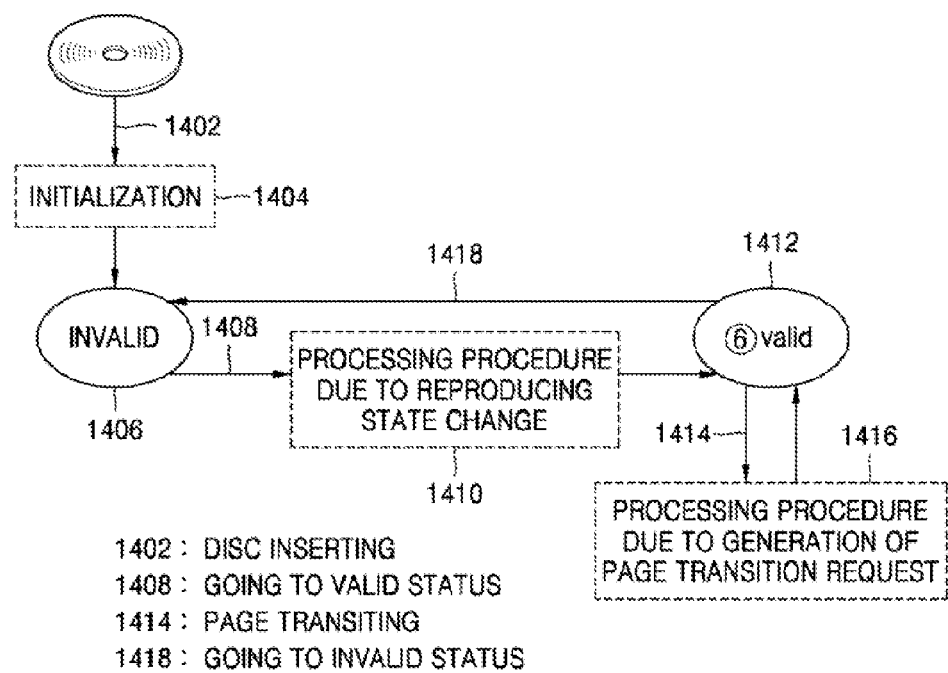
FIG. 14 illustrates a page selection model when an interactive graphic stream is processed.

FIG. 14 illustrates a page selection model when an interactive graphic stream is processed.

Referring to FIG. 14, a process required to display a proper page in an ICS when the reproducing apparatus processes the interactive graphic stream is illustrated. Two general statuses 1406 and 1412, each represented as an elliptic shape, and three temporary statuses 1404, 1410, and 1416, each represented as a rectangular shape, are shown. The two general statuses indicate an invalid status 1406 and a valid status 1412. The valid status 1412 indicates a state of reproducing a valid epoch of a current interactive graphic stream. The invalid status 1412 indicates a reproduction stop state or a state in which a valid interactive graphic stream does not exist even if the status is in the reproducing state. A general status as described above maintains a current state unless a transition to another status is generated.

A transition, such as a reference number 1402, 1408, 1414, or 1418, is generated by a reproducing state change, a UOP, or a navigation command. If the transition is generated, a processing procedure, such as a reference number 1404, 1410, or 1416, proceeds in order to obtain a proper interactive graphic stream and page information. The four transitions are disc inserting 1402, going to the valid status 1408, page transiting 1414, and going to the invalid status 1418.

Each transition process will now be described in detail.

Figure 15:
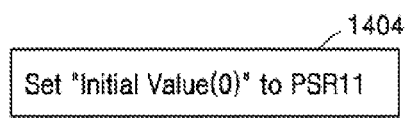
FIG. 15 illustrates an initializing procedure shown in FIG. 14.

FIG. 15 illustrates the initializing procedure 1404 shown in FIG. 14. Referring to FIGS. 14, 13, and 15, when a storage medium is inserted in the reproducing apparatus, the reproducing apparatus moves to the initializing status 1404, which is a temporary status, in order to obtain a proper interactive graphic stream and page information. In the initializing status 1404, a procedure of setting the PSR is performed as shown in FIG. 15. That is, an initial value 0 is set to the PSR11 storing a page_id value of a menu page to be first displayed. The reproducing apparatus moves to the invalid status 1406 after the initializing procedure 1404.

FIG. 16 illustrates the processing procedure 1410 due to a reproducing state change shown in FIG. 14.

Referring to FIG. 16, the invalid status 1406 is continuously maintained until a valid epoch of an interactive graphic stream begins, and if a transition of beginning to reproduce the valid epoch of the interactive graphic stream is generated such as the reference number 1408, the reproducing apparatus moves to the reproducing state change status 1410. In the reproducing state change status 1410, the processing procedure shown in FIG. 16 is performed. That is, a default_selected_page_id value is read from an ICS in operation 1602, and if the value is a valid page_id value, the value is set to the PSR11 in operation 1606, and if the value is invalid, whether a current PSR11 value is a valid page_id value is checked. Based on the result of the checking, if the current PSR11 is already set to a valid page_id value, the current PSR11 value is maintained in operation 1608, and if the current PSR11 value is invalid, a first page_id value of the ICS is set as the PSR11 value in operation 1610. Accordingly, the reproducing apparatus is changed from the invalid status 1406 to the valid status 1412.

FIG. 17 illustrates the processing procedure 1416 due to generation of a page transition request shown in FIG. 14.

Referring to FIGS. 14 and 17, a specific page of the ICS selected through the procedure 1410 described in FIG. 16 maintains the valid status 1412 until the time designated by the composition_time_out_pts field unless a UOP takes place. However, in a case where a UOP of activating a button to which a navigation command to transit to another page is allocated, such as the reference number 1414, is received, the valid status 1412 is transited to the processing status 1416 due to generation of a page transition request.

In the processing status 1416 due to generation of a page transition request, the processing procedure shown in FIG. 17 is performed. That is, if a value X of page_id for which a page transition request is generated is valid, the PSR11 is set to X in operation 1702, and if the value X is invalid, a current page_id value is maintained in operation 1704. As is described above, when the processing procedure 1416 due to generation of a page transition request is finished, the valid status 1412 is maintained.

In a case where the time designated by the composition_time_out_pts field of a currently reproduced ICS elapses, or in a case where the interactive graphic stream is changed, since a currently displayed page becomes invalid, the valid status 1412 is transited to the invalid status 1406. That is, if a transition such as the reference number 1418 is generated, a last page_id value stored in the PSR11 is maintained.

As is described above, according to embodiments of the present invention, an ICS structure of an interactive graphic stream including a plurality of menu pages and a model of selecting a proper page in an ICS are provided.

Accordingly, a plurality of menu pages may be provided regardless of application types of a main stream.

Also, various transition effects may be applied when transitions between menu pages are performed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory computer readable storage medium configured to store graphic data, the graphic data being decoded in a unit of epoch in a reproducing apparatus, the non-transitory computer readable storage medium comprising:
   video data; and
   the graphic data configured to provide a menu overlaid on an image based on the video data and comprises a plurality of display sets,
   wherein each display set comprises a composition segment, an object segment, and a palette segment, the composition segment comprises information for defining on a plurality of menu pages, each menu page comprising a page identification and transition effect information which is used when a transition of a corresponding menu page is performed, the transition of the corresponding menu page being performed when the corresponding menu page is displayed or disappears, and the composition segment further comprises status information indicating a type of a corresponding display set comprising the composition segment, the display set being located within an epoch.

2. An apparatus configured to reproduce video data and graphic data from a non-transitory computer readable storage medium, the graphic data being decoded in a unit of epoch, the apparatus comprising:

a decoder configured to decode the video data; and a graphic decoder configured to decode the graphic data which provides a menu overlaid on an image based on the video data and comprises a plurality of display sets, wherein each display set comprises a composition segment, an object segment, and a palette segment, the composition segment comprises information for defining a plurality of menu pages, each menu page comprising a page identification and transition effect information which is used when a transition of a corresponding menu page is performed, the transition of the corresponding menu page being performed when the corresponding menu page is displayed or disappears, and the composition segment further comprises status information indicating a type of a corresponding display set comprising the composition segment, the display set beinq located within an epoch.

3. The apparatus of claim 2, wherein the epoch begins with an epoch start (ES) display set, and an acquisition point (AP) or normal case (NC) display set follows the ES display set.

4. The apparatus of claim 3, wherein the ES display set is included in one epoch, and the AP or NC display set is selectively included.

* * * * *